United States Patent [19]

Sangu

[11] Patent Number: 4,864,754
[45] Date of Patent: Sep. 12, 1989

[54] MESSAGE DISPLAY DEVICE FOR MOTOR VEHICLE

[75] Inventor: Kazuhito Sangu, Tokyo, Japan

[73] Assignee: Honda Giken Kogyo Kabushiki Kaisha, Tokyo, Japan

[21] Appl. No.: 119,597

[22] Filed: Nov. 12, 1987

[30] Foreign Application Priority Data

Nov. 12, 1986 [JP] Japan .................. 61-173540[U]

[51] Int. Cl.$^4$ .............................................. G09F 21/04
[52] U.S. Cl. ...................................... 40/593; 350/338; 40/427
[58] Field of Search ............... 40/593, 427; 350/331 R

[56] References Cited

U.S. PATENT DOCUMENTS

| | | | |
|---|---|---|---|
| 3,168,070 | 2/1965 | Verney | 40/593 |
| 4,129,857 | 12/1978 | Espinosa | 40/593 |
| 4,470,214 | 9/1984 | Kinloch | 40/593 |
| 4,715,642 | 12/1987 | Dobbs | 40/593 |

FOREIGN PATENT DOCUMENTS 59-193744 12/1984 Japan .

Primary Examiner—John Weiss
Attorney, Agent, or Firm—Armstrong, Nikaido, Marmelstein, Kubovcik & Murray

[57] ABSTRACT

A message message display device for a motor vehicle comprises a message radiating mechanism disposed in a rear portion of the motor vehicle for radiating a message rearwardly of the motor vehicle, and a control mechanism operatively connected to the message radiating mechanism for enabling the message radiating mechanism to radiate the message substantially rearwardly of the motor vehicle. The message radiating mechanism comprises a display unit disposed outside of at least a rear sight of a rearview mirror of the motor vehicle and operatively connected to the control mechanism for radiating an image light beam indicative of the message in response to a signal from the control mechanism, and a transparent reflecting plate for reflecting the image light beam from the display unit substantially rearwardly of the motor vehicle.

23 Claims, 7 Drawing Sheets

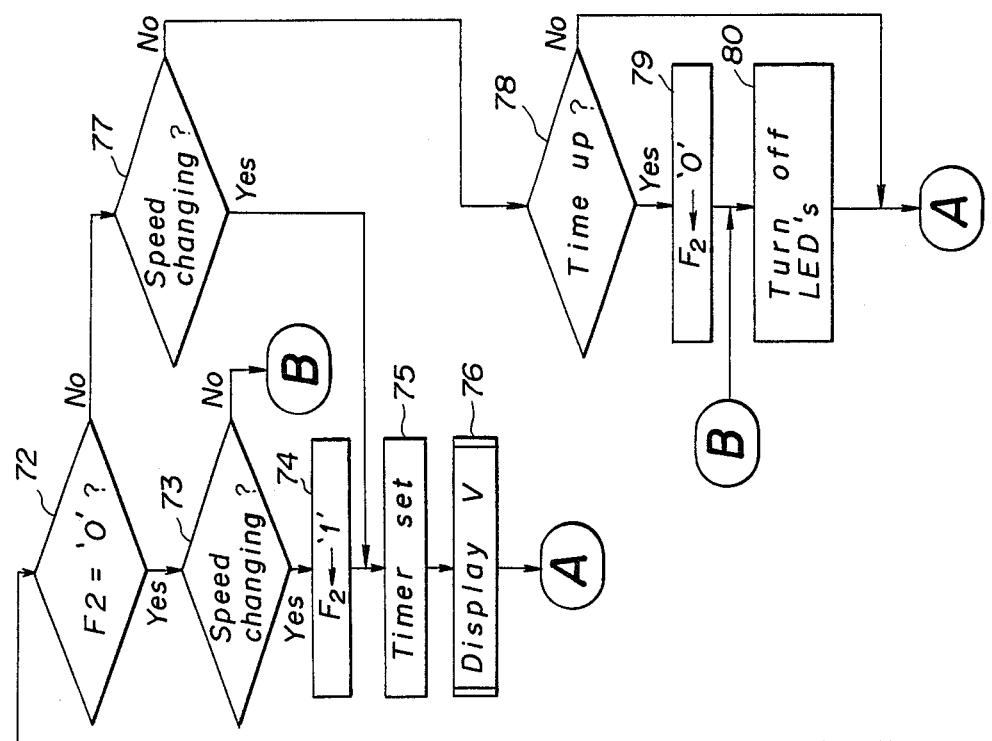
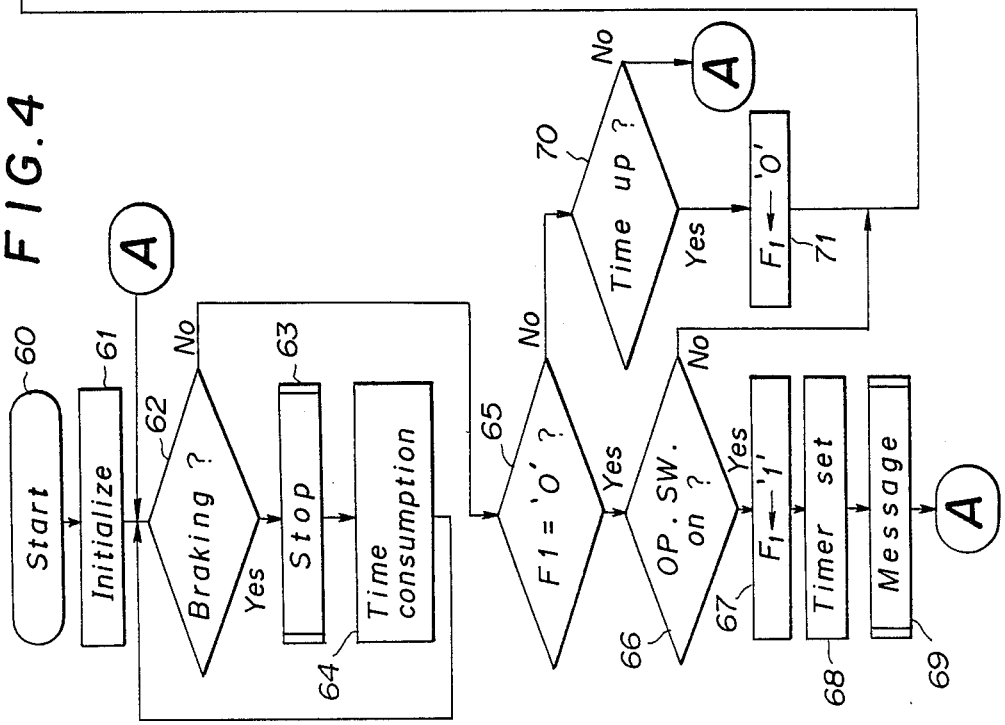
FIG. 4

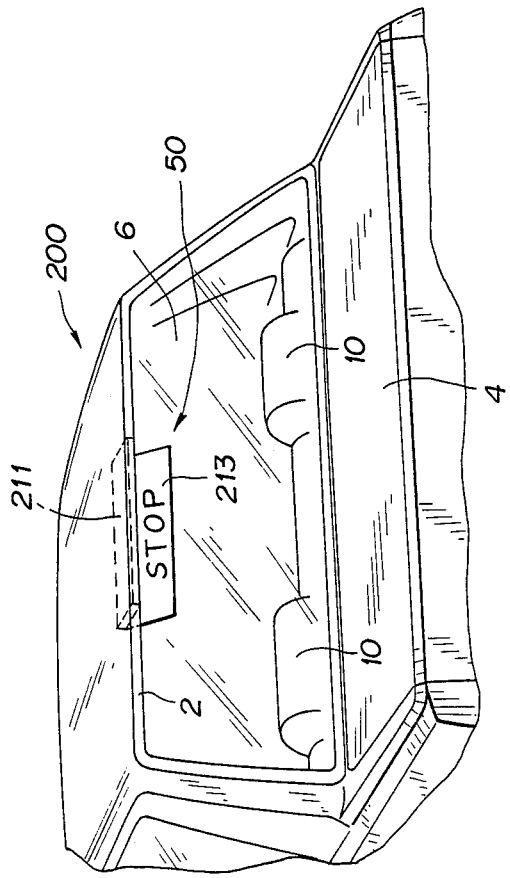
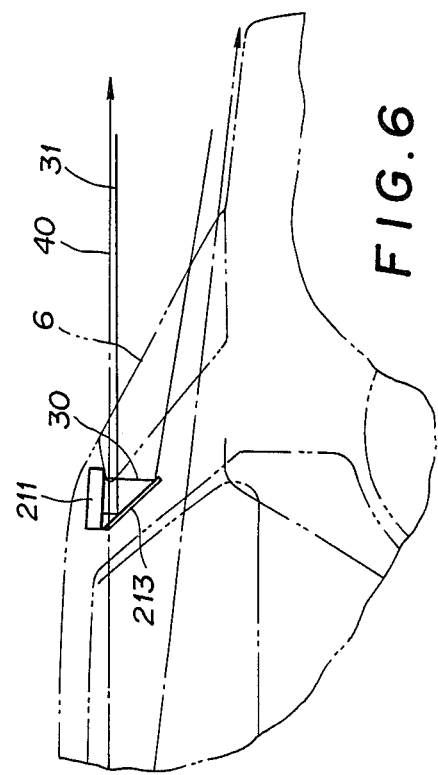

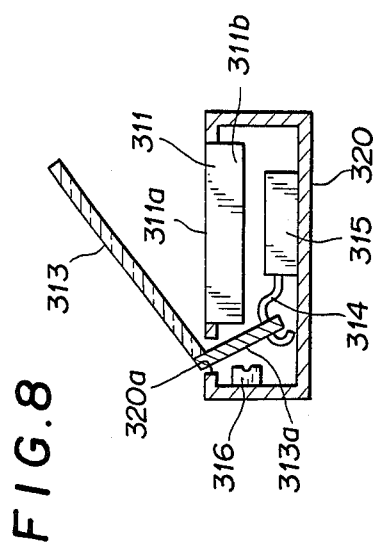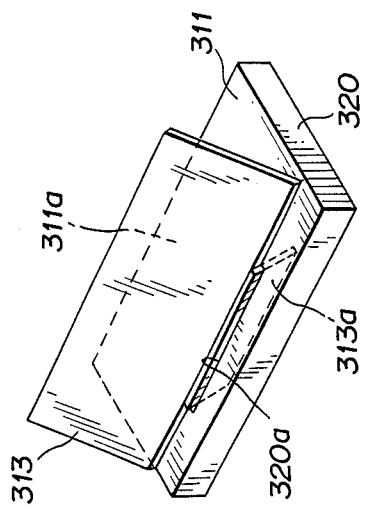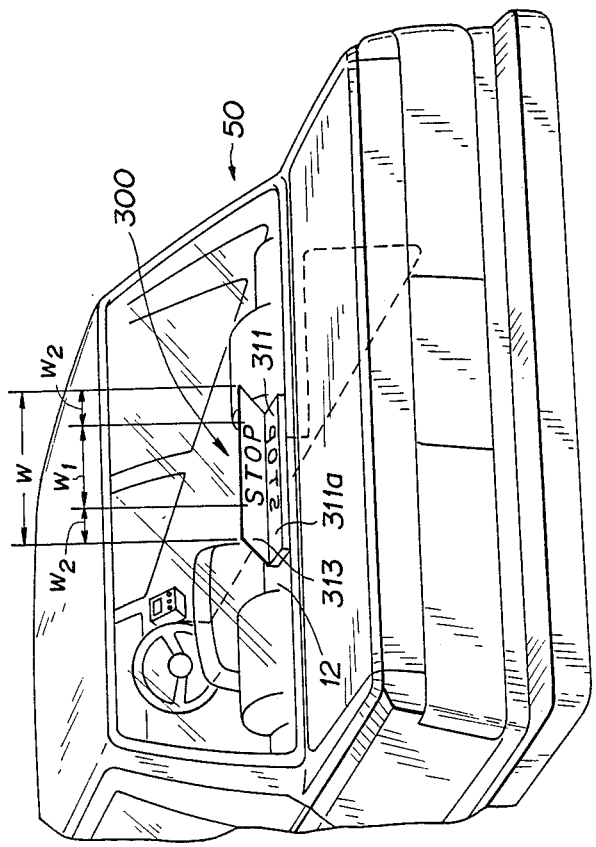

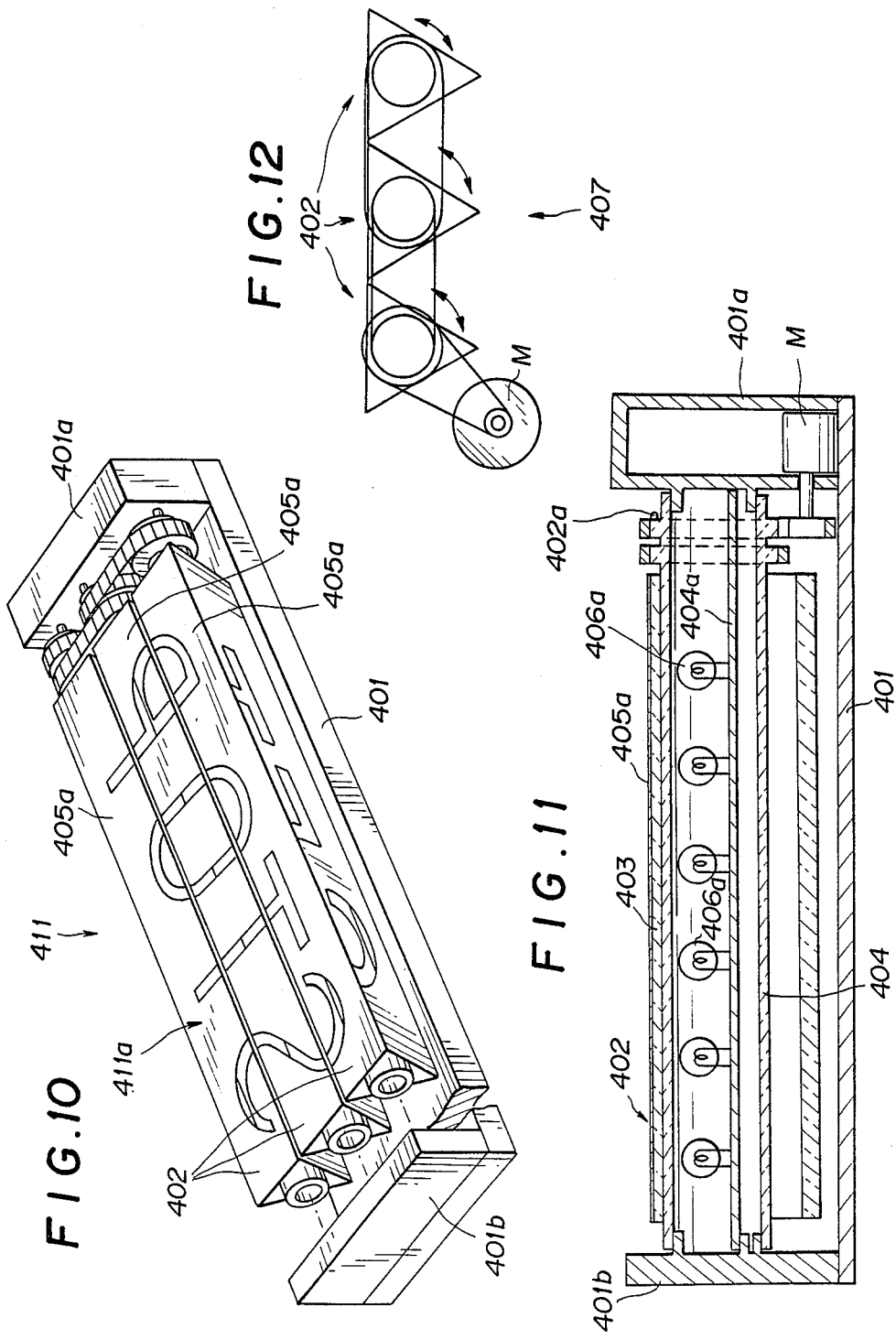

MESSAGE DISPLAY DEVICE FOR MOTOR VEHICLE

BACKGROUND OF THE INVENTION

1. Field of the Invention

The present invention relates to a message display device, and more particularly to a message display device for use in a motor vehicle.

2. Description of the Relevant Art

Japanese Laid-Open Patent Publication No. 59-193744, for example, discloses an automotive message display device for transmitting a message, such as of gratitude, of the driver of a first motor vehicle to a second motor vehicle behind the first motor vehicle. The disclosed message display device includes a display unit mounted on a rear parcel shelf inward of a rear window of the first motor vehicle and a pad of operating keys located near the driver's seat. The display unit of the display device comprises a lamp or liquid crystal display unit for displaying letters such as "Thank you" so as to be visible from behind the first motor vehicle. For example, after the first motor vehicle has passed the second motor vehicle, the driver operates the pad of operating keys to enable the display unit to display the letters to give his gratitude to the driver of the second motor vehicle. Therefore, the message display device can transmit the intention of the driver of the first motor vehicle to the second motor vehicle running behind.

The display unit of the display device is so small that it cannot be viewed within the vision of the rearview mirror in the cabin of the first motor vehicle and also cannot be viewed within the rear sight of the driver when the driver looks back. Therefore, the visibility of the display unit from the second motor vehicle may not be good enough.

Accordingly, there has been a demand for a message display device capable of displaying a message that can well be viewed from a motor vehicle to which it is addressed.

Therefore, the present invention has been made in an effort to meet the aforesaid demand for a message display device for displaying a well recognizable message.

SUMMARY OF THE INVENTION

It is an object of the present invention to provide a message display device for a motor vehicle, which can display a message that can well be viewed from a second motor vehicle behind the motor vehicle giving the message.

In order to achieve the above object, there has been provided according to the present invention a message display device for a motor vehicle, comprising a message radiating device disposed in a rear portion of the motor vehicle for radiating a message rearwardly of the motor vehicle, and a control device operatively connected to the message radiating device for enabling the message radiating device to radiate the message substantially rearwardly of the motor vehicle, the message radiating device comprising a display unit disposed outside of at least a rear sight of a rearview mirror of the motor vehicle and operatively connected to the control device for radiating an image light beam indicative of the message in response to a signal from the control device, and a transparent reflecting plate for reflecting the image light beam from the display unit substantially rearwardly of the motor vehicle.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is a flowchart of a signal processing sequence executed by an MCU in the circuit arrangement illustrated in FIG. 3;

FIGS. 5 and 6 are perspective and side elevational views of a message display device according to a second embodiment of the present invention;

FIG. 7 is a perspective view of a message display device according to a third embodiment of the present invention;

FIGS. 8 and 9 are cross-sectional and perspective views of a display unit of the message display device shown in FIG. 7;

FIGS. 10, 11, 12, 13, 14 are views showing a modified display unit; and

DETAILED DESCRIPTION OF THE PREFERRED EMBODIMENTS

Figure 2:
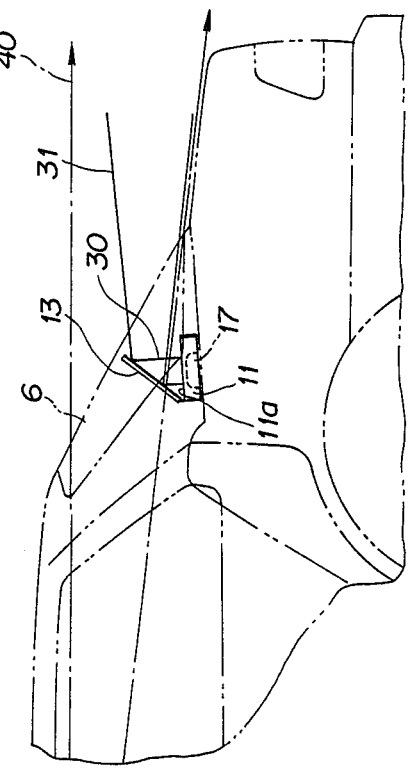
FIG. 2 is a side elevational view of a display unit of the message display device shown in FIG. 1.
Figure 1:
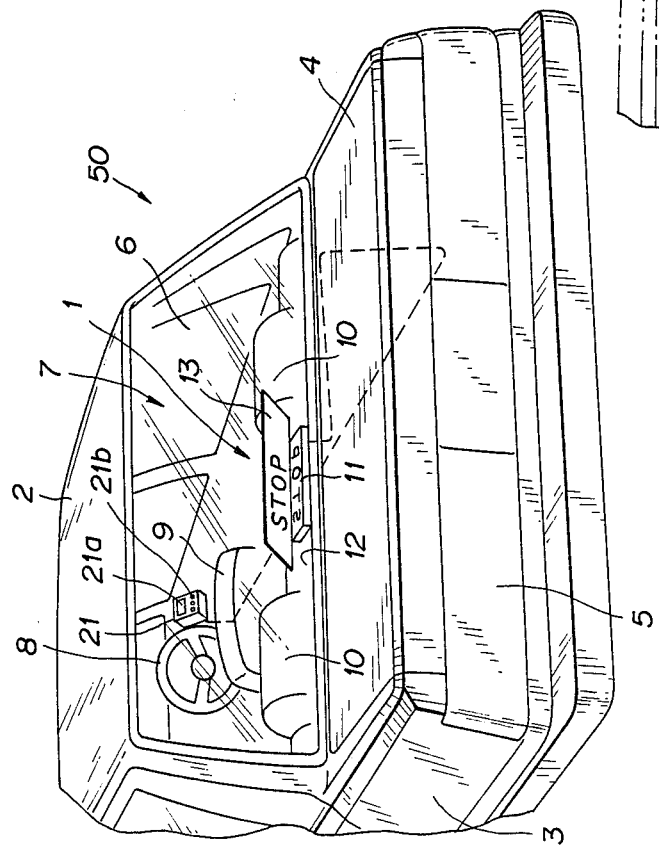
FIG. 1 is a perspective view, as viewed from behind, of a message display device for a motor vehicle according to a first embodiment of the present invention.

As shown in FIGS. 1 and 2, a message display device 1 for a motor vehicle according to a first embodiment of the present invention is installed in a motor vehicle 50 having a roof panel 2, a rear fender 3, a trunk lid 4, and a tail lamp 5. The message display device 1 comprises a display unit 11 in the form of a flat box mounted on a rear parcel shelf 12 disposed inwardly of a rear window 6 and extending the full width of the rear window 6, a rectangular transparent reflecting plate 13 fixedly mounted on the front edge of the display unit 11 and inclined rearwardly in the upward direction at a prescribed angle, and an operating unit 21 disposed laterally of a steering wheel 8 in front of a driver's seat and electrically connected to the display unit 11. The transparent reflecting plate 13 has a longer side extending in the transverse direction of the motor vehicle 50. The transparent reflecting plate 13 reflects a message displayed on an upper display surface 11a of the display unit 11 in a rearward direction of the motor vehicle 50. The display unit 11 is positioned behind two headrests 10 of a rear seat in a cabin 7 at an intermediate position between the headrests 10.

The upper display surface 11a of the display unit 11 comprises a multiplicity of LEDs and is driven by a drive controller 17 in the display unit 11.

The transparent reflecting plate 13 comprises a frameless plate of acrylic resin with its surface coated with a hard layer. The transparent reflecting plate 13 has transverse and longitudinal dimensions larger than those of the upper display surface 11a of the display unit 11. The length of the transparent reflecting plate 13 is about ⅓ of the width of the motor vehicle 50. The transparent reflecting plate 13 of acrylic resin may be replaced with any of various colored transparent plates.

The operating unit 21 has a monitor liquid crystal display unit 21a, and a plurality of message selecting buttons 21b. The message selecting buttons 21b serve to select one of a plurality of messages stored in a memory in a microcomputer unit (hereinafter referred to as an "MCU") 15. The stored messages may include "Back", "Please", "Beginner", "Waiting", and "Thank you". The memory also stores other messages regarding braking and vehicle speed, as described later on.

As shown in FIG. 2, an image light beam 30 indicative of a selected message is radiated vertically upwardly from the upper display surface 11a, and most of the image light beam 30 is reflected by the reverse side of the transparent reflecting plate 13 and radiated rearwardly as an image light beam 31 through the rear window 6 so as to be visually recognized by the driver of another motor vehicle. The light which is not reflected rearwardly by the transparent reflecting plate 13 is passed upwardly through the transparent reflecting plate 13. A portion of the light passed through the transparent reflecting plate 13 is reflected by an inner surface of the rear window 6 toward the driver. However, the amount of light which is reflected toward the driver is quite small. Dependent on the amount of light of a message displayed on the upper display surface 11a, the driver can confirm that the display unit 11 is in operation by viewing the reflected light. The transparent reflecting plate 13 is positioned such that it can be viewed within a rear sight 40 of the driver through a rearview mirror in the cabin 7. Since the transparent reflecting plate 13 is transparent, the driver can view the rear area through the transparent reflecting plate 13. The display unit 11 in the form of a flat box is placed outside of the rear sight 40. The large-size transparent reflecting plate 13 allows the entire reflected image light beam 31 indicative of the image to be visually recognizable even from an area obliquely rearward of the motor vehicle 50. When the driver seated on the driver's seat 9 looks back, the direct sight of the driver is larger than the rear sight 40, and the driver can view the rear area through the transparent reflecting plate 13.

Figure 3:
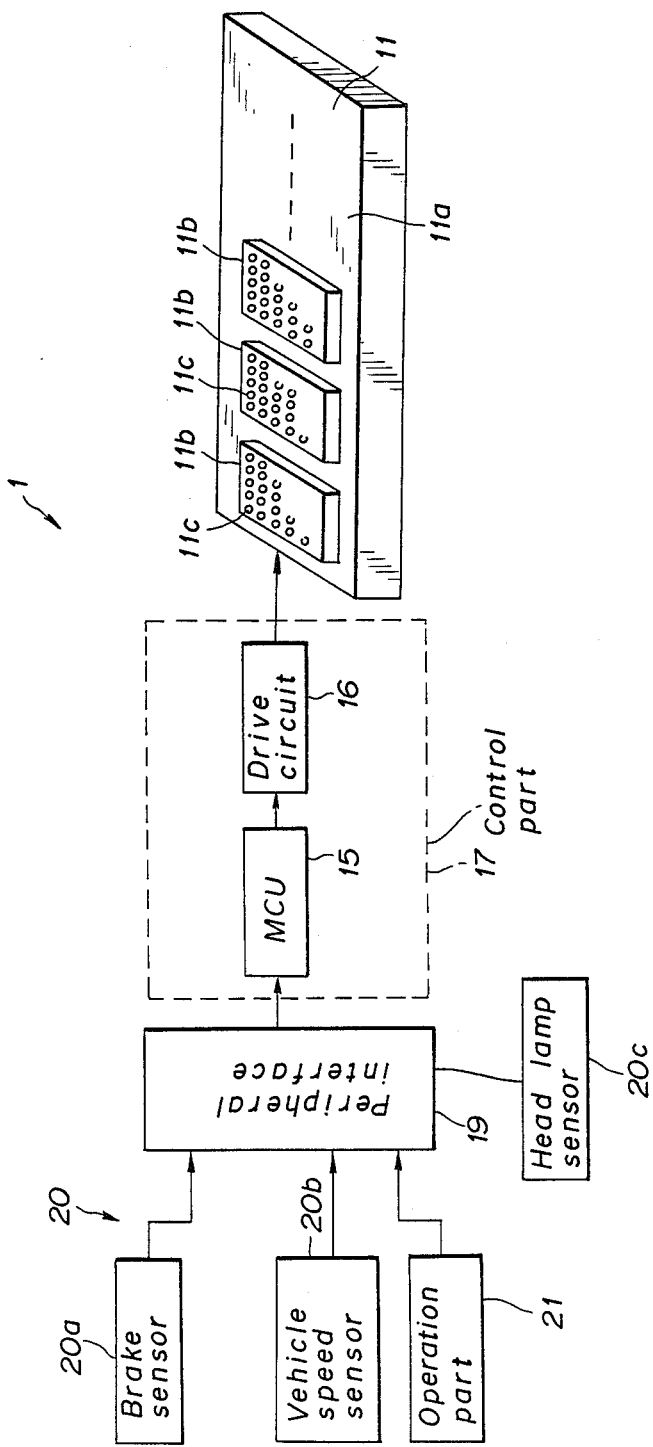
FIG. 3 is block diagram of a circuit arrangement of the message display device shown in FIG. 1.

FIG. 3 shows in block form a circuit arrangement of the message display device 1.

An array of dot-matrix LED display elements 11b is placed on the upper surface of the display unit 11 in the transverse direction of the motor vehicle 50. Each of the display elements 11b has a matrix of LEDs 11c drivable by the drive controller 17 for displaying a single letter. The display elements 11b jointly constitute the upper display surface 11a of the display unit 11. The number of display elements 11b is equal to the number of letters of the longest one of the messages that can be displayed by the display unit 11. Therefore, when the longest message is displayed, all of the display elements 11b are energized. When displaying a short message such as "Stop", as described later on, only four display elements 11b are used which alternate with certain de-energized display elements 11b.

The drive controller 17 comprises the MCU 15, and a driver 16 controlled by the MCU 15 for driving the display elements 11b. The MCU 15 includes a RAM, a ROM, an interface, and other circuit elements, and receives signals from various sensors 20 and the operating unit 21 through an input circuit 19. The sensors 20 include a brake sensor 20a for detecting whether a brake (not shown) is actuated or not, a vehicle speed sensor 20b for detecting the speed of the motor vehicle 50, and a head lamp sensor 20c for detecting head lamps (not shown) are energized or not. As described below, the MCU 15 is responsive to signals from the sensors 20 and the operating unit 21 for controlling the driver 16 to enable the display elements 10b to display respective letters for thereby displaying a desired message on the upper display surface 11a. The ROM stores display patterns of the messages to be displayed, the display patterns being the mirror images of the normal patterns of the messages that can be read directly.

When displaying a desired image on the upper display surface 11a, the MCU 15 first increases or reduces a drive current to be supplied to the LEDs 11c based on the signal from the head lamp sensor 20c. More specifically, when the head lamps are not energized, a prescribed drive current is supplied to the LEDs 11c. When the head lamps are energized, a smaller drive current is supplied to the LEDs 11c. As a result, the upper display surface 11a display the desired message with the amount of light commensurate with the brightness or light condition around the display unit 11.

The MCU 15 gives overriding priority to the signal from the brake sensor 20a. More specifically, while the brake is being applied, the MCU 15 controls the driver 16 to enable the upper display surface 11a to display the message "Stop" irrespective of the signal from the vehicle speed sensor 20b and the operating signal from the operating unit 21. The message will remain displayed in a very short period of time such as 0.3 second even after the brake is released. In displaying this message, only four of the display elements 11b are used with the other display elements de-energized.

Based on the signal from the vehicle speed sensor 20b, the MCU 15 controls the driver 16 to enable the upper display surface 11a to display a message "Up" when the motor vehicle 50 is accelerating beyond a certain rate and a message "Down" when the motor vehicle 50 is decelerating beyond a certain rate. The message will remain displayed a short period of time such as 1 second even after the acceleration or deceleration of the motor vehicle 50 is finished. The MCU 15 controls the driver 16 to enable each of the display elements 11b to increase the size of the displayed letter as the vehicle speed V is increased. Instead of the above message "Up" or "Down", it is possible to digitally display the value of the vehicle speed V as a message during acceleration or deceleration.

When any of the message selecting buttons 21b of the operating unit 21 is operated while the message relating to acceleration or deceleration is being displayed, the MCU 15 controls the driver 16 to display the message corresponding to the depressed message selecting button 21b for a certain period of time such as about 5 to 30 seconds, rather than the acceleration or deceleration message. Likewise, when the vehicle speed V goes higher, the MCU 15 drives the driver 16 so that the letter displayed on each of the display elements 11b becomes larger in size. The message selected by the depressed message selecting button 21b is also displayed on the monitor liquid crystal display unit 21a.

The message "Back" is selected on the operating unit 21 by the driver when the gear change lever is shifted into a reverse range. However, instead of selecting the message "Back" with one of the message selecting buttons 21b of the operating unit 21, this message may be automatically selected by using a sensor which detects when the gear change lever is shifted into the reverse range.

FIG. 4 shows steps 60 through 80 of a schematic flowchart of a signal processing sequence executed by a CPU (not shown) in the MCU 15.

When an ignition switch is turned on, the CPU starts to process the signals from the sensors 20 and the operating unit 21 in the step 60.

Certain circuits and internal variables are initialized in the step 61. Specifically, flags F1, F2 used in the steps 65, 67, 71, 72, 74, 79 (described later) are reset to "0".

The step 62 ascertains whether the brake is actuated or not. If actuated, control goes to the step 62, and if not, control goes to the step 65.

In the step 63, the driver 16 is controlled to display the message "Stop" on the upper display surface 11a. This message remains displayed unless the display unit 11 is de-energized. This also holds true for the steps 69, 79.

In the step 64, the time of about 0.3 second is consumed. Then, control goes back to the step 62.

The step 65 ascertains whether a first flag F1 is "0" or not. If "0", then control proceeds to the step 66, and if not, control goes to the step 70.

The step 66 checks if any one of the message selecting buttons 21b of the operating unit 21 is turned on or not. If turned on, then control goes to the step 67, and if not, then control goes to the step 72. Each of the message selecting buttons 21b is combined with a pop-up switch having a spring. When any of the message selecting buttons 21b is once actuated, the input circuit 19 stores information on such actuation of the message selecting button 21b until the CPU detects the information.

In the step 67, the first flag F1 is set to "1". Then, in the step 68, a prescribed time interval, e.g., about 5 to 30 seconds, is set in a software-implemented timer in the RAM.

In the step 69, the driver 16 is controlled to display the message corresponding to the actuated message selecting button 21b on the upper display surface 11a. The CPU controls the driver 16 so that the letter displayed on each display element 11b grows larger in size as the vehicle speed V increases. From the step 69, control goes back to the step 62.

The step 70 determines if the software-implemented timer has reached a time-out condition. If yes, then control goes to the step 71, and if not, then control goes back to the step 62.

In the step 71, the first flag F1 is reset to "0". Then, control proceeds to the step 72.

The step 72 ascertains whether a second flag F2 is "0" or not. If "0", then control goes to the step 73, and if not, then control goes to the step 77.

The step 73 ascertains whether the motor vehicle 50 is accelerating beyond a certain rate or decelerating beyond a certain rate, i.e., whether the vehicle speed V varies in excess of a certain rate. If yes, then control goes to the step 74, and if not, then control goes to the step 80.

In the step 74, the second flag F is set to "1". In the next step 75, the software-implemented timer is set to a given time period such as 1 second, for example. In the step 76, the driver 16 is controlled to enable the upper display surface 11a to display the corresponding one of the messages "Up" and "Down". As the vehicle speed V goes higher, the CPU controls the driver 16 so that the letter displayed on each display element 11b increases in size. Where the value of the vehicle speed V is digitally displayed, the value of the vehicle speed V at that time is displayed. Thereafter, control returns to the step 62.

The step 77 ascertains whether the vehicle speed V varies in excess of a certain rate, as with the step 72. If yes, then control goes to the step 75, and if not, then control goes to the step 78.

The step 78 checks if the software-implemented timer has reached a time-out condition. If yes, then control goes to the step 79, and if not, then control goes back to the step 62.

In the step 79, the second flag F2 is reset to "0". Thereafter, all of the display elements of the upper display surface 11a are de-energized in the step 80, from which control returns to the step 62.

With the present invention, as described above, the message display device 1 allows displayed messages to be well viewed from another motor vehicle behind the motor vehicle which gives the display. Since the reflecting plate 13 is transparent, the driver can see the rear area through the transparent reflecting plate 13 via the rearview mirror in the cabin or directly when the driver looks back. Therefore, the transparent reflecting plate 13 can be increased in size.

The maximum number of letters that can be contained in one displayed message is equal to or less than the number of the dot-matrix LED display elements 11b. However, it is possible to arrange the dot-matrix LED display elements 11b closely side by side in the transverse direction of the motor vehicle 50 so that a desired message can move or flow in the transverse direction. With this arrangement, a message containing more letters than the dot-matrix LED display elements can be displayed.

FIGS. 5 and 6 illustrate a message display device for a motor vehicle according to a second embodiment of the present invention. Those parts which are identical to Those of the first embodiment are denoted by identical reference numerals or are not illustrated, and will not be described in detail.

A message display device 200 has a display unit 211 in the form of a flat box which is attached to the lower surface of the roof panel 2 inwardly of the rear window 6. The message display device 200 includes a rectangular transparent reflecting plate 213, similar the transparent reflecting plate 13, attached to the front edge of the display unit 211 and inclined at an angle rearwardly in the downward direction.

The message display device 200 can operate in the same manner as and offers the same advantages as the message display device 1 according to the first embodiment. Moreover, the display unit 211 can be attached at various locations more freely.

FIG. 7 shows a message display device for a motor vehicle according to a third embodiment of the present invention. Those parts which are identical to those of the first embodiment are denoted by identical reference numerals or are not denoted, and will not be described in detail.

A message display device 300 has a display unit 311 positioned in the same manner as the display unit 11 shown in FIG. 1. The message display device 300 includes a transparent reflecting plate 313 openably and closably attached to the display unit 311. The transparent reflecting plate 313 has substantially the same shape and area as those of an upper display surface 311a of the display unit 311. The transparent reflecting plate 313 has a width w in the transverse direction of the motor vehicle 50. The width w is larger than the width w1 of a longest message that can be displayed on the upper display surface 311a, by the width w2 of one letter on each side of the displayed message. Therefore, the entire message reflected by the transparent reflecting plate 313 can well be viewed even from an area obliquely rearward of the motor vehicle 50.

As shown in FIGS. 8 and 9, the display unit 311 has a casing 320 housing an array of display elements 311b fixed to the upper surface of the casing 320 in the transverse direction of the motor vehicle 50. The upper surface of the casing 320 has a slit 320a defined in a front portion thereof and extending in the transverse direction of the motor vehicle 50. The transparent reflecting plate 313 is supported by a base plate 313a inserted in the slit 320a so as to be swingable back and forth. The base plate 313a has a lower edge engaging the rear end of a hook 314 movable back and forth by a solenoid 315 disposed on the bottom wall of the casing 320. When a message is to be displayed, the solenoid 315 is energized by a drive controller (not shown) to swing the base plate 313a backwards to lift the transparent reflecting plate 313 to a certain angular position. When no message is displayed, the base plate 313a is swung in a forward direction until the reflecting surface of the transparent reflecting plate 313 lies closely to an upper display surface 311a of the display unit 311. The limit position of the base plate 313a at the time the transparent reflecting plate 313 lies down is detected by a limit switch 316 attached to the inner surface of the front wall of the casing 320. The limit switch 316 also serves as a damper for the base plate 313a.

The message display device 300 can operate in the same manner as and offers the same advantages as the message display device 1 according to the first embodiment. In addition, when various objects such as parcels are placed on the rear parcel shelf 12, the transparent reflecting plate 313 may be fully folded down and kept in a nonuse condition. Since the transparent reflecting plate 313 can be folded down against the display unit 311, the message display device 300 can be stored in a small space in a warehouse, for example, and can also be handled with ease.

Figure 14:
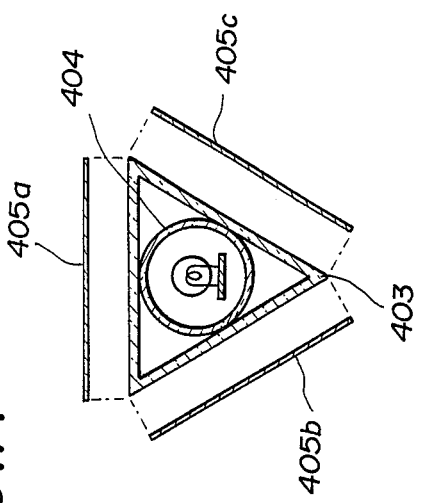
Figure 13:
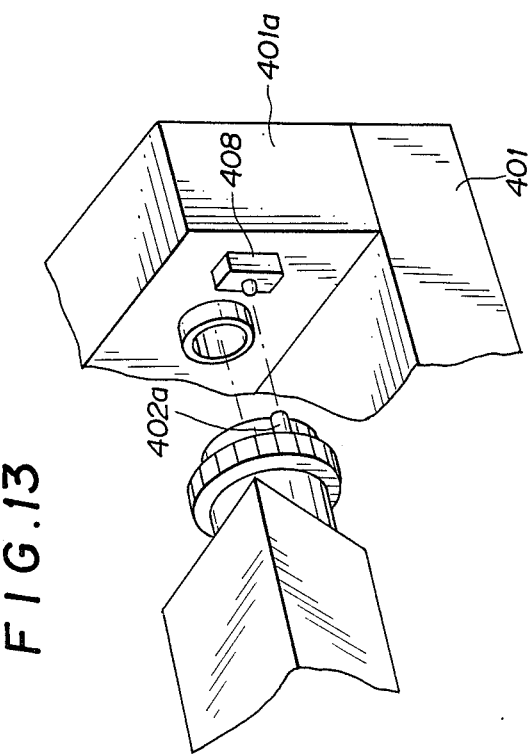

FIGS. 10, 11, 12, 13, and 14 show a modified display unit, with other members such as a transparent reflecting plate being omitted from illustration. FIG. 10 is a perspective view of the display unit, FIG. 11 is a vertical cross-sectional view of the display unit, FIG. 12 is a schematic front elevational view of a transmission mechanism in the display unit, FIG. 13 is a perspective view of a limit switch, and FIG. 14 is a cross-sectional view of a single display element.

A display unit 411 has a base plate 401 elongate in the transverse direction of the motor vehicle and a plurality of (three, in the illustrated embodiment) display elements 402 positioned above the base plate 401, each of the display elements 402 being in the shape of a triangular prism. The display elements 402 have respective longitudinal axes extending in the transverse direction of the motor vehicle and mutually spaced at small intervals in the longitudinal direction of the motor vehicle. Each of the display elements 402 comprises a hollow outer transparent member 403 having a regular triangle cross section, a hollow cylindrical inner transparent member 404 fitted closely in the outer transparent member 403, and stencils 405a, 405b, 405c attached respectively to the sides of the outer transparent member 403. The stencils 405a, 405b, 405c of one display element 402 constitute first, second, and third segment display surfaces of the display element 402. The display elements 402 are arranged such that when each of the display elements 402 is brought into successive prescribed angular positions, the first, second, and third segment display surfaces lie in the same plane. The stencils 405a, 405b, 405c may be detachably mounted on the outer transparent member 403 so that different messages can be displayed. When the three stencils 405a of the display elements 402 lie flush with each other, they constitute an upper display surface 411a of the display unit 411 and cooperate with each other in forming and displaying a certain message. The stencils 405b, 405c also jointly form and display respective messages when they lie flush with each other. For example, the three stencils 405a form and display a message "Stop".

In each display element 402, the inner transparent member 404 is longer than the outer transparent member 403 and has opposite ends projecting laterally beyond the respective opposite ends of the outer transparent member 403. The base plate 401 has opposite ends on which shoulders or brackets 401a, 401b are mounted, and the opposite ends of the three inner transparent members 404 are rotatably supported on the shoulders 401a, 401b. Three rods 404a extend respectively through the inner transparent members 404 from one shoulder 401a to the other shoulder 401b. Each of the rods 404a support a plurality of small lamps 406a attached thereto. An electric motor M is disposed in the shoulder 401a below the rods 404a. Rotation of the motor M is transmitted by a belt-and-pulley mechanism 407 at a reduced speed to the inner transparent members 404 for synchronously rotating the display elements 402.

The motor M and the small lamps 406a are driven and energized by a drive controller (not shown). The drive controller energizes the motor M to cause one group of cooperating stencils to form the upper display surface 411a, as shown in FIG. 10, and energizes the small lamps 406a. As with the previous embodiments, the small lamps 406a are continuously energized for a prescribed period of time, and then de-energized. In FIG. 10, the group of the stencils 405a is in the upper display position.

For bringing the group of the stencils 405b or 405c to the upper display position from the condition of FIG. 10, the display elements 402 are turned 120° in one direction and then stopped. The shoulder 401a supports microswitches 408 for detecting when projections 402a on ends of the display elements 402 reach desired angular positions of the display elements 402. The microswitches 408 are electrically connected to the drive controller. As can readily be understood, the display unit 411 can selectively display three messages, "Stop", "Thank you", and "Please", for example. The message "Stop" can be displayed when the brake of the motor vehicle is actuated. The messages "Thank you" and "Please" can be displayed when respective message selecting buttons (not shown) are operated.

The display unit 411 is simpler in construction and can be controlled more easily than the display units of the previous embodiments. Therefore, the display unit 411 and hence the message display device employing the display unit 411 are inexpensive to manufacture.

Figure 15:
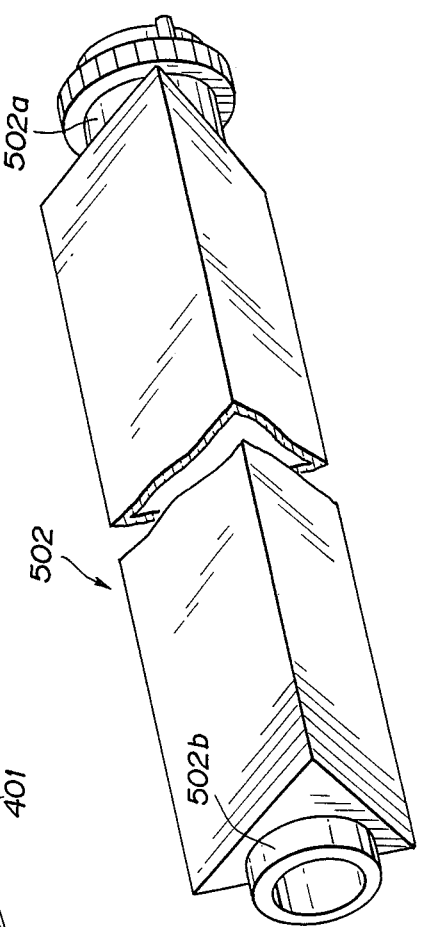
FIG. 15 is a view of a modification of a display element of the display unit shown in FIG. 10.

FIG. 15 shows a modification of the display element shown in FIG. 10. A display element 502 has no hollow cylindrical inner transparent member, but has a hollow outer transparent member of a regular triangle cross section having cylindrical projections 502a, 502b on respective opposite ends thereof. The display element 502 is rotatably supported on the shoulders on the base plate by the cylindrical projections 502a, 502b.

The illustrated display elements may be replaced with CRTs, light-emitting liquid crystal elements, plasma display elements, electroluminescent display elements, or other display elements. The display units may not necessarily be integral with, but may be separate from the transparent reflecting plate.

The message display devices for selectively displaying messages so as to be visible from behind a motor vehicle have been described above in detail. The present invention is however applicable to various message display devices having display units which are required to be placed within the sight of the operator or the detectable region of a certain detector. For example, the present invention is applicable to a device for displaying a vacancy mark on a taxi, or a device for displaying a message in the screen of a video monitor to watch the entrance of a house.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A message display device for a motor vehicle, comprising:
   message radiating means, disposed in a rear portion of the motor vehicle for radiating a message rearwardly of the motor vehicle; and
   control means, connected to said message radiating means for enabling said message radiating means to radiate the message substantially rearwardly of the motor vehicle;
   said message radiating means including
   a display unit disposed outside of at least a rear sight of a rearview mirror of the motor vehicle and connected to said control means, said display unit radiating an image light beam, indicative of said message, in response to a signal from said control means; and
   a transparent reflecting plate reflecting said image light beam from said display unit substantially rearwardly of the motor vehicle.

2. A message display device according to claim 1, wherein said control means has an operating unit having message selecting buttons for manually selecting one of a plurality of messages.

3. A message display device according to claim 2, further including sensor means for detecting when a brake of said motor vehicle is actuated;
   said control means including a display enabling means for enabling said display unit to display a message regarding actuation of the brake in an overriding relation to any message selected by said message selecting buttons when the actuation of the brake is detected by said sensor means.

4. A message display device for a motor vehicle, comprising comprising:
   message radiating means, disposed in a rear portion of the motor vehicle, for radiating a message rearwardly of the motor vehicle; and
   control means, connected to said message radiating means, for enabling said message radiating means to radiate the message substantially rearwardly of the motor vehicle, said control means having an operating unit having message selection buttons for manually selecting a plurality of messages;
   said message radiating means including
   a display unit disposed outside of at least a rear sight of a rearview mirror of the motor vehicle and connected to said control means, said display unit radiating an image light beam, indicative of said message, in response to a signal from said control means, and
   a transparent reflecting plate reflecting said image light beam from said display unit substantially rearwardly of the motor vehicle.

5. A message display device according to claim 4, wherein said message radiating means is arranged rearwardly of a driver seat and is arranged close to a rear window within a cabin of the motor vehicle.

6. A message display device according to claim 4, wherein said transparent reflecting plate is inclined rearwardly of the motor vehicle.

7. A message display device according to claim 4, wherein said transparent reflecting plate has a width in a transverse direction of a motor vehicle wider than a width of the image light beam from the display unit.

8. A message display device according to claim 4, further including sensor means for detecting when a brake of said motor vehicle is actuated;
   said control means including a display enabling means for enabling said display unit to display a message regarding actuation of the brake in an overriding relation to any message selected by said message selecting buttons when the actuation of the brake is detected by said sensor means.

9. A message display device according to claims 1 or 4, wherein said transparent reflecting plate is swingably mounted on said display unit.

10. A message display device according to claims 1 or 4, wherein said transparent reflecting plate is fixedly mounted on said display unit.

11. A message display device according to claims 1 or 4, wherein said display unit is disposed on a rear parcel shelf of said motor vehicle.

12. A message display device according to claims 1 or 4, wherein said display unit is attached to a lower surface of a roof panel of said motor vehicle.

13. A message display device according to claims 1 or 4, wherein said display unit has a display surface for radiating said image light beam in a vertical direction.

14. A message display device according to claim 13, wherein said transparent reflecting plate has a width in a transverse direction of the motor vehicle, said width being greater than a width, in the transverse direction of the motor vehicle, of a display surface of said display unit.

15. A message display device according to claim 13, wherein said transparent reflecting plate has a width in a transverse direction of the motor vehicle, said width being substantially the same as a width, in the transverse direction of the motor vehicle, of a display surface of said display unit, said width of said transparent reflecting plate being larger than a width of a longest message that can be displayed on said display surface, by a prescribed interval on each side of said longest message.

16. A message display device according to claims 1 or 4, wherein said display unit has a display surface comprising a plurality of dot-matrix LEDs controlled by said control means.

17. A message display device according to claims 1 or 4, wherein said display unit comprises a plurality of display elements each in a form of a triangular prism and having first, second, and third segment display surfaces, said display elements being arranged such that cooperating ones of said first, second, and third segment display surfaces lie flush with each other, and a drive mechanism for rotating said display elements;
   said cooperating ones of said first, second, and third segment display surfaces, when lying flush with each other, jointly constituting a display surfaces of said display unit to form and display the message.

18. A message display device for a motor vehicle, comprising:
   a message radiating means, disposed in a rear portion of the motor vehicle, for radiating a message rearwardly of the motor vehicle, said message radiating means including
   a display unit radiating an image light beam indicating said message in response to a signal, and
   a transparent reflecting plate reflecting substantially rearwardly said image light beam from said display unit; and
   control means, connected to said message radiating means, for outputting said signal to said display unit indicating said message and for enabling said message radiating means to radiate the message substantially rearwardly of the motor vehicle.

19. A message display device for a motor vehicle, comprising:
   a message radiating means, disposed in a rear portion of the motor vehicle, for radiating a message rearwardly; and
   control means, connected to said message radiating means, for enabling said message radiating means to radiate the message substantially rearwardly of the motor vehicle, said control means including message selection buttons for manually selecting one of a plurality of messages and a microcomputer means for storing said plurality of messages;
   said message radiating means including
      a display unit connected to said control means, said display unit radiating an image light beam, indicative of said message, in response to a signal from said control means, said display unit including light emitting diodes for radiating said image light beam, and
      a transparent reflecting plate reflecting said image light beam from said display unit substantially rearwardly of the motor vehicle.

20. A message display device according to claims 18 or 19 further including a brightness adjusting means for adjusting the brightness of said image light beam according to the amount of light around said display unit.

21. A message display device according to claims 18 or 19 further comprising an adjusting means for adjusting the size of the displayed message.

22. A message display device according to claims 18 or 19, wherein said transparent reflecting plate has a width in a transverse direction of the motor vehicle greater than a width of a display surface of said display unit in the transverse direction of the motor vehicle.

23. A message display device according to claims 18 or 19, wherein said transparent reflecting plate does not block a rearview of a driver of the vehicle of a rearview mirror.

* * * * *